(No Model.)
J. BRUSIE.
PNEUMATIC CLUTCH.
No. 473,380.  Patented Apr. 19, 1892.
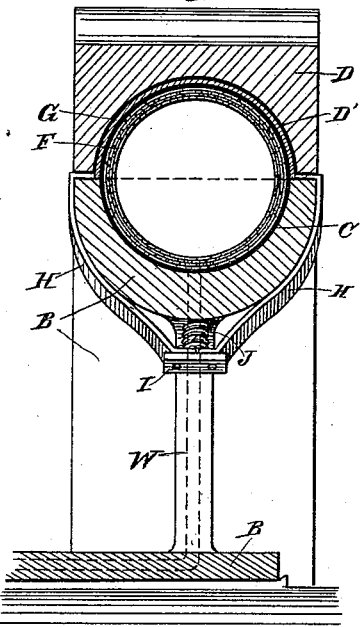
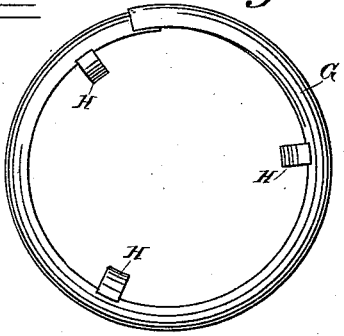
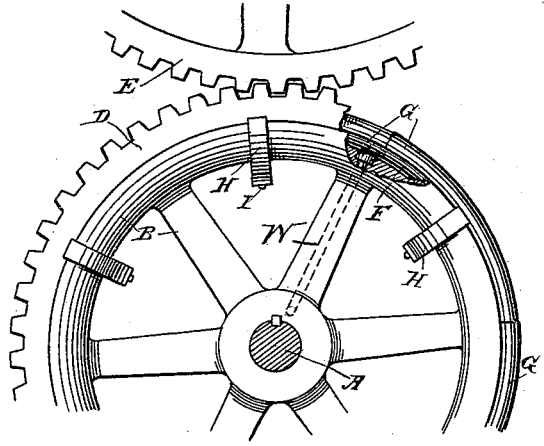
Witnesses,
Inventor,
James Brusie
By Dewey & Co
Attys

UNITED STATES PATENT OFFICE.

JAMES BRUSIE, OF OAKLAND, CALIFORNIA.

PNEUMATIC CLUTCH.

SPECIFICATION forming part of Letters Patent No. 473,380, dated April 19, 1892.

Application filed August 18, 1891. Serial No. 403,027. (No model.)

*To all whom it may concern:*

Be it known that I, JAMES BRUSIE, a citizen of the United States, residing at Oakland, Alameda county, State of California, have invented an Improvement in Pneumatic Clutches; and I hereby declare the following to be a full, clear, and exact description of the same.

My invention relates to certain improvements in what is termed a "pneumatic clutch," which is designed to be used upon rotary machinery in which one portion is to be kept constantly running, while the other portion is subject to stops without arresting the motion of the first-named portion.

It consists of a combination of a pneumatically-expansible tube or collar fitted between the adjacent faces of the two portions of the machinery and a shoe fitting the exterior of the expansible tube, whereby abrading friction between the tube and the outer portion of the clutch is relieved.

It also consists in certain details of construction, which will be more fully described by reference to the accompanying drawings, in which—

Figure 1 shows my device in cross-section. Fig. 2 is a side view of the same. Fig. 3 shows a detached continuous shoe.

In my invention, A is a shaft having fixed upon it the wheels or other machinery which it is desired to drive.

B is one portion of the clutch mechanism, which is keyed to the shaft. In the present case this is shown in the form of a wheel having a smooth groove or channel turned in its periphery, as shown at C. The other portion of the clutch is represented by D, and consists in the present case of a wheel having a toothed periphery engaged and rotated by the toothed wheel E of my desired form of motion. The outer portion D of the clutch extends over the periphery of the inner portion B and has a corresponding groove or channel D' made in it opposite to the groove C, which is made in the portion B of the clutch. This groove or channel is of sufficient diameter to admit a flexible elastic tube F, which is made of any suitable material, the ends being connected together, and when not expanded by interior pressure it allows the moving part of the clutch to move freely over it while it lies in that portion which is stationary. When the tube is expanded by admitting air into it through the pipe or passage W, it fills the channel between the two parts, and the friction between its outer surface and the outer portion of the clutch is sufficient to move the latter. I have found that with this construction the abrading wear upon the outer part of the elastic tube is so great as to destroy it in a short time. I have therefore devised a shoe or protection for the tube, which is my present invention. This shoe G is made of thin elastic metal and may be made either in sections slightly overlapping each other at their meeting ends or in one continuous piece the ends of which overlap. This shoe is made to fit the exterior of the tube, and at intervals lugs H extend from it outside of the inner portion of the clutch, meeting at the point I, where they are acted upon by springs J. These springs tend to force them inwardly, and thus draw the shoe into close contact with the exterior of the flexible tube. This keeps it from pressing upon the exterior portion of the clutch, and when the tube is collapsed the springs will draw the shoe out of contact with the exterior portion of the clutch. When the tube is expanded by admitting air thereto, the flexibility and elasticity of the shoe is such that the pressure will force it outward into contact with the outer portion of the clutch, the springs J yielding to allow of this action. By this operation the two are gripped together, so that the rotation of the inner portion is communicated to the outer portion. When the tube is again collapsed, the elastic flexible shoe will be drawn inwardly to follow the collapsing tube and withdraw it from contact with the outer portion of the clutch. This shoe acts as a protection to the flexible tube, and as there is no movement over the surface of the tube the latter will not be destroyed thereby.

Having thus described my invention, what I claim as new, and desire to secure by Letters Patent, is—

1. A two-part clutch, one member of which is connected with the driving and the other with the driven part, and grooves made in the adjacent meeting faces of the two parts of the clutch, an expansible tube fitting the groove or channel, and a means for supplying and exhausting air, in combination with the shoe fitting the exterior of the tube and between it and the outer surface of the clutch, substantially as herein described.

2. The two-part clutch, one member of which is connected with the driving and the other with the driven part, grooves made in the adjacent meeting faces of the two parts of the clutch, and an expansible tube fitting said groove, in combination with an exterior flexible metallic shoe intermediate between the tube and the adjacent moving surface, lugs extending from said segment around the inner portion of the clutch, and springs acting through said lugs to hold the shoe in contact with the exterior of the tube, substantially as herein described.

In witness whereof I have hereunto set my hand.

JAMES BRUSIE.

Witnesses:
S. H. NOURSE,
H. F. ASCHECK.